(12) United States Patent
Trembley et al.

(10) Patent No.: US 8,573,000 B2
(45) Date of Patent: Nov. 5, 2013

(54) CRYOGENIC TUNNEL FREEZER

(75) Inventors: Jean-Philippe Trembley, Epsom (GB);
Jeremy Paul Miller, Gloucestershire
(GB); Michael Robert Himes,
Macungie, PA (US)

(73) Assignee: Air Products and Chemicals, Inc.,
Allentown, PA (US)

( * ) Notice: Subject to any disclaimer, the term of this patent is extended or adjusted under 35 U.S.C. 154(b) by 198 days.

(21) Appl. No.: 12/921,990

(22) PCT Filed: Mar. 11, 2009

(86) PCT No.: PCT/US2009/036798
§ 371 (c)(1),
(2), (4) Date: Nov. 22, 2010

(87) PCT Pub. No.: WO2009/114610
PCT Pub. Date: Sep. 17, 2009

(65) Prior Publication Data
US 2011/0185761 A1 Aug. 4, 2011

Related U.S. Application Data

(60) Provisional application No. 61/035,616, filed on Mar. 11, 2008.

(51) Int. Cl.
*F25D 17/02* (2006.01)
*F25D 25/04* (2006.01)
*F25D 3/12* (2006.01)
*F25D 25/00* (2006.01)
*F25D 13/06* (2006.01)
*B65G 15/00* (2006.01)
*A23B 4/044* (2006.01)

(52) U.S. Cl.
USPC ............... 62/374; 62/373; 62/380; 62/388; 62/62; 62/63; 62/64; 198/626.3; 99/477

(58) Field of Classification Search
USPC ............ 62/62–65, 373, 374, 380, 388; 198/465.2, 604, 608, 620, 626.3; 99/404, 443 C, 477, 478
See application file for complete search history.

(56) References Cited

U.S. PATENT DOCUMENTS 3,238,736 A * 3/1966 Macintosh ................. 62/63
3,298,188 A * 1/1967 Webster et al. ............. 62/63

(Continued)

FOREIGN PATENT DOCUMENTS

EP 0249323 A1 12/1987
EP 0667501 A1 8/1995

*Primary Examiner* — Judy Swann
*Assistant Examiner* — Christopher R Zerphey
(74) *Attorney, Agent, or Firm* — Damon A. Neagle; Eric J. Schaal; Larry S. Zelson

(57) ABSTRACT

A cryogenic tunnel freezer (10) having modular design and construction including a lower section (16) that can be raised and lowered relative to an upper section (14), the upper and lower sections (14, 16) defining a tunnel (12) when the lower section (16) is in a closed (raised) position. Product is moved through the tunnel (12) via a belt (22) formed of arrays of plastic modules (76) that are reinforced by metal chains (140) and rods (150). The lower run (23) of the belt (22) rides on the floor (48) of the lower section (16) and the upper run (21) rides on the lower run (23) when the belt (22) is operated. The flow of cryogenic fluid through the tunnel (12) is aided by vaporization of a cryogenic fluid and baffles (98), but no air-moving devices located within the tunnel (12).

20 Claims, 9 Drawing Sheets

(56) References Cited

U.S. PATENT DOCUMENTS

| | | | | |
|---|---|---|---|---|
| 3,553,973 | A | * | 1/1971 | Moran ................................ 62/63 |
| 3,870,141 | A | * | 3/1975 | Lapeyre et al. ............... 198/853 |
| 3,993,189 | A | * | 11/1976 | Khoylian et al. .......... 198/464.3 |
| 4,944,162 | A | * | 7/1990 | Lang et al. ...................... 62/380 |
| 4,955,209 | A | * | 9/1990 | Smith .............................. 62/380 |
| 5,123,261 | A | * | 6/1992 | Cope ................................ 62/374 |
| 5,417,074 | A | * | 5/1995 | McAfee et al. ................... 62/63 |
| 5,444,985 | A | | 8/1995 | Lang et al. |
| 5,968,578 | A | * | 10/1999 | Knisely .......................... 426/524 |
| 6,401,480 | B2 | * | 6/2002 | Krumbock et al. ............. 62/374 |
| 6,619,069 | B1 | * | 9/2003 | Persson ........................... 62/381 |
| 2004/0011627 | A1 | | 1/2004 | Palmaer et al. |
| 2005/0241332 | A1 | * | 11/2005 | Kamm ............................ 62/380 |

\* cited by examiner

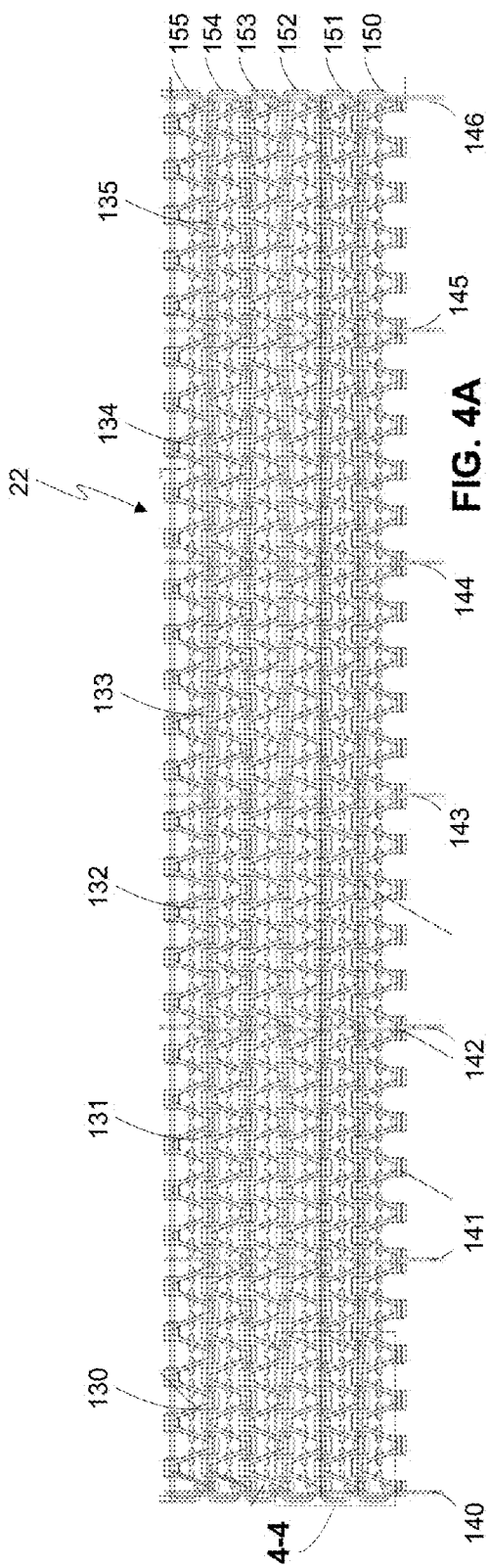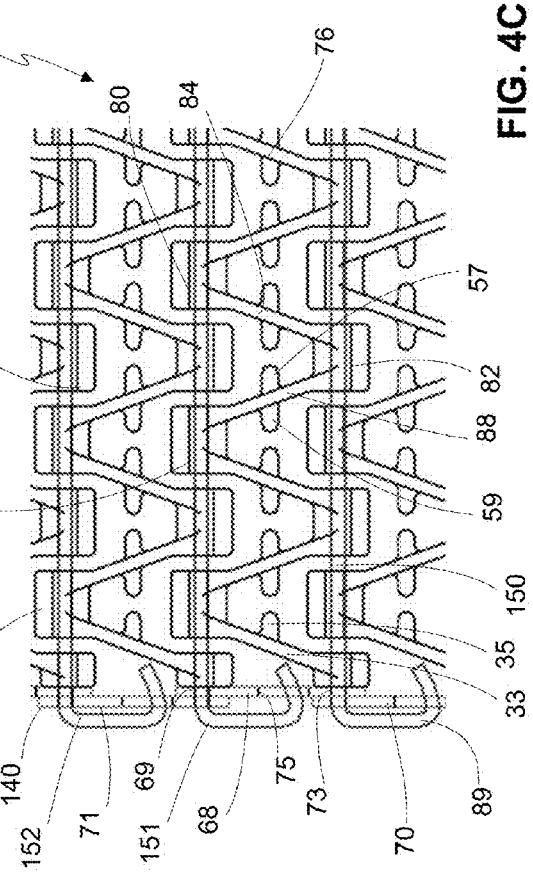
FIG. 4A
FIG. 4B
FIG. 4C

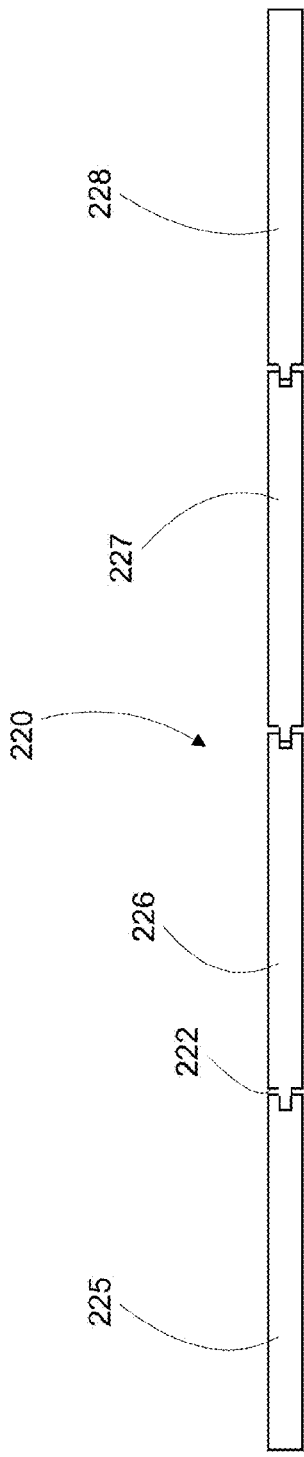
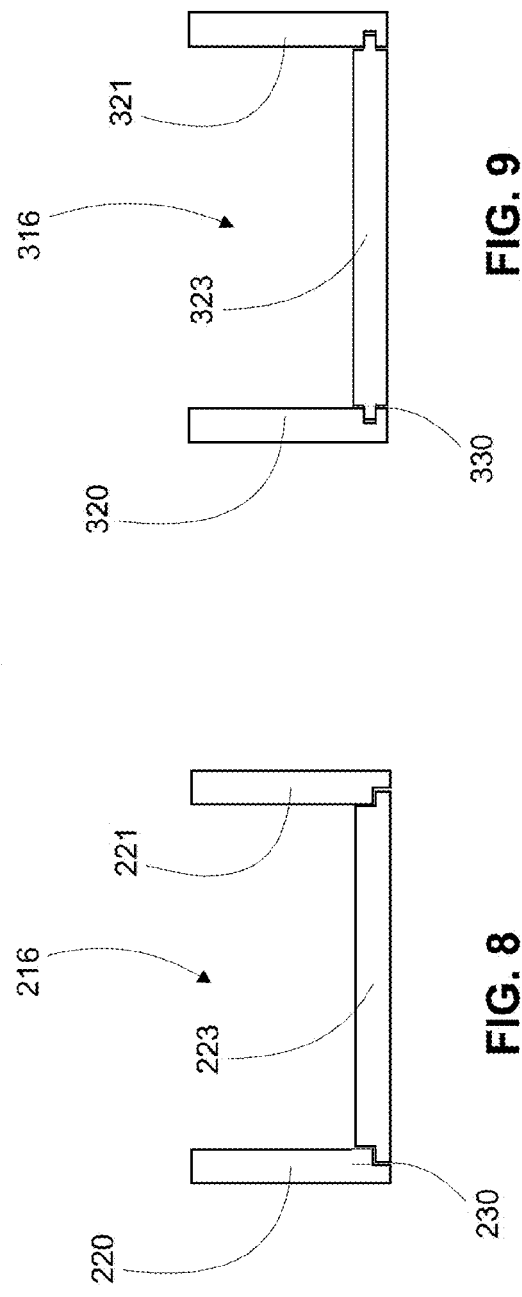
FIG. 7
FIG. 8
FIG. 9

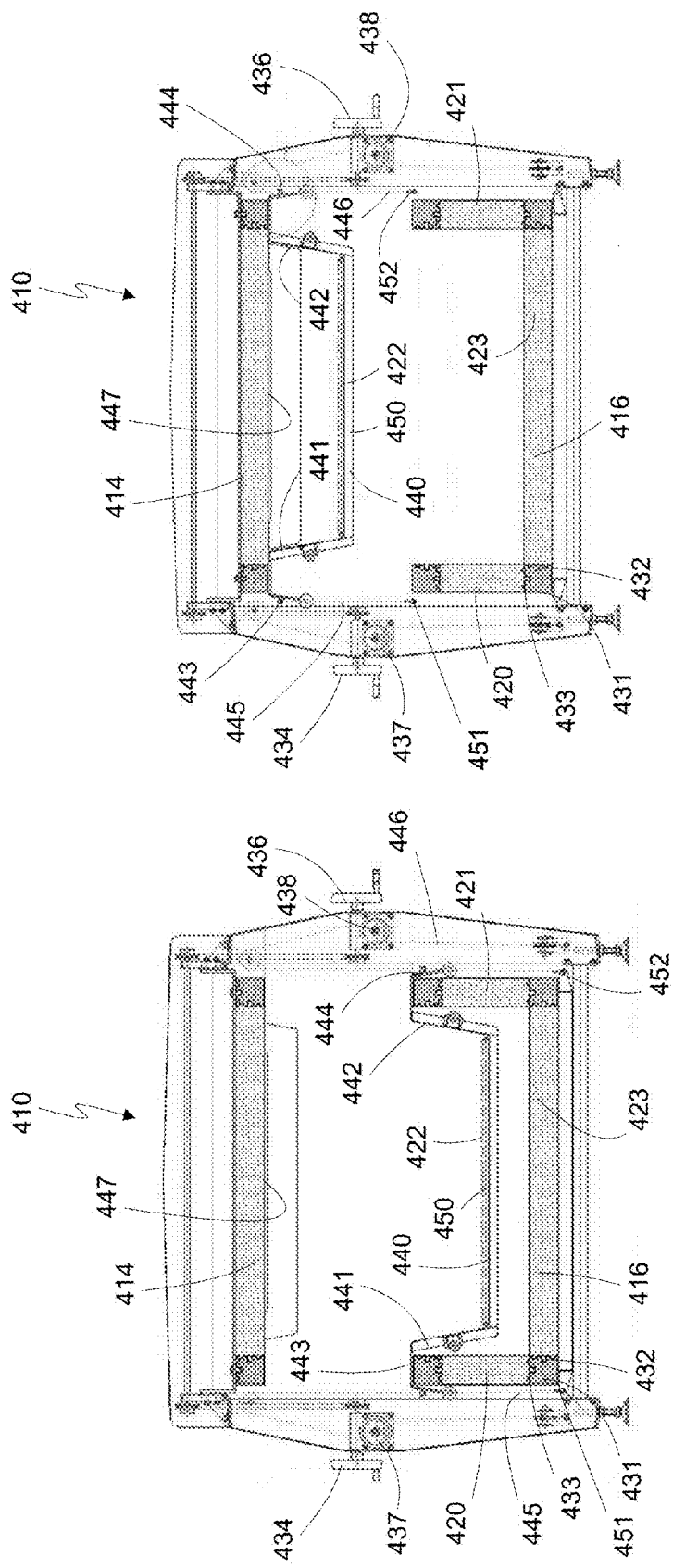

CRYOGENIC TUNNEL FREEZER

FIELD OF INVENTION

The present invention relates to tunnel freezers that use a cryogen to cool or freeze products passed therethrough, such as food products.

BACKGROUND

The benefits of using a cryogen, such as liquid nitrogen (LIN), to cool and freeze food products are well-known. In addition to dramatically decreasing the time required to freeze a particular food product, in many cases the taste, color, and texture of a cryogenically-frozen food product is superior to conventional, non-cryogenic freezing methods.

Cryogenic tunnel freezers are a common type of cryogenic freezer in the food industry. In a cryogenic tunnel freezer, the food product is cooled by passing the food product through the tunnel along a belt and exposing the food product to the cryogen within the tunnel. Most conventional tunnel freezers include fans located within the tunnel that circulate the cryogen.

For many small and mid-sized food processing operations, use of conventional cryogenic tunnel freezers is not cost-effective, due to their high purchase and operating costs, as well as the fact that they are not well-suited for intermittent use. In addition, most cryogenic tunnel freezers consume LIN at a rate that requires large on-site LIN storage tanks and associated equipment, adding further investment considerations to the customer's overall freezing cost. Therefore, there is a need for a cryogenic tunnel freezer that is better-suited for use in small and mid-sized food processing operations.

BRIEF DESCRIPTION OF THE DRAWING(S)

FIG. 4A is a partial view of a belt used in the freezer;

FIG. 4B is an enlarged view of a link used in the belt;

FIG. 4C is an enlarged sectional view of area 4-4 of FIG. 4A;

FIG. 7 is a top view of a sidewall of the lower section of the freezer shown in FIG. 1;

FIG. 8 is a sectional view taken along line 3-3 of FIG. 2, which has been simplified to omit all parts except the lower section of the freezer;

FIG. 9 is a sectional view taken along line 3-3 of FIG. 2, which has been simplified to omit all parts except an alternate embodiment of the lower section of the freezer;

FIG. 11 is a sectional view taken along line 3-3 of FIG. 2, showing the freezer of FIG. 10 with the lower section in an open position; and FIG. 12 is a sectional view taken along line 3-3 of FIG. 2, showing the freezer of FIG. 10 with the lower section in a closed position and the liner in a raised position.

SUMMARY OF THE INVENTION

Figure 1:
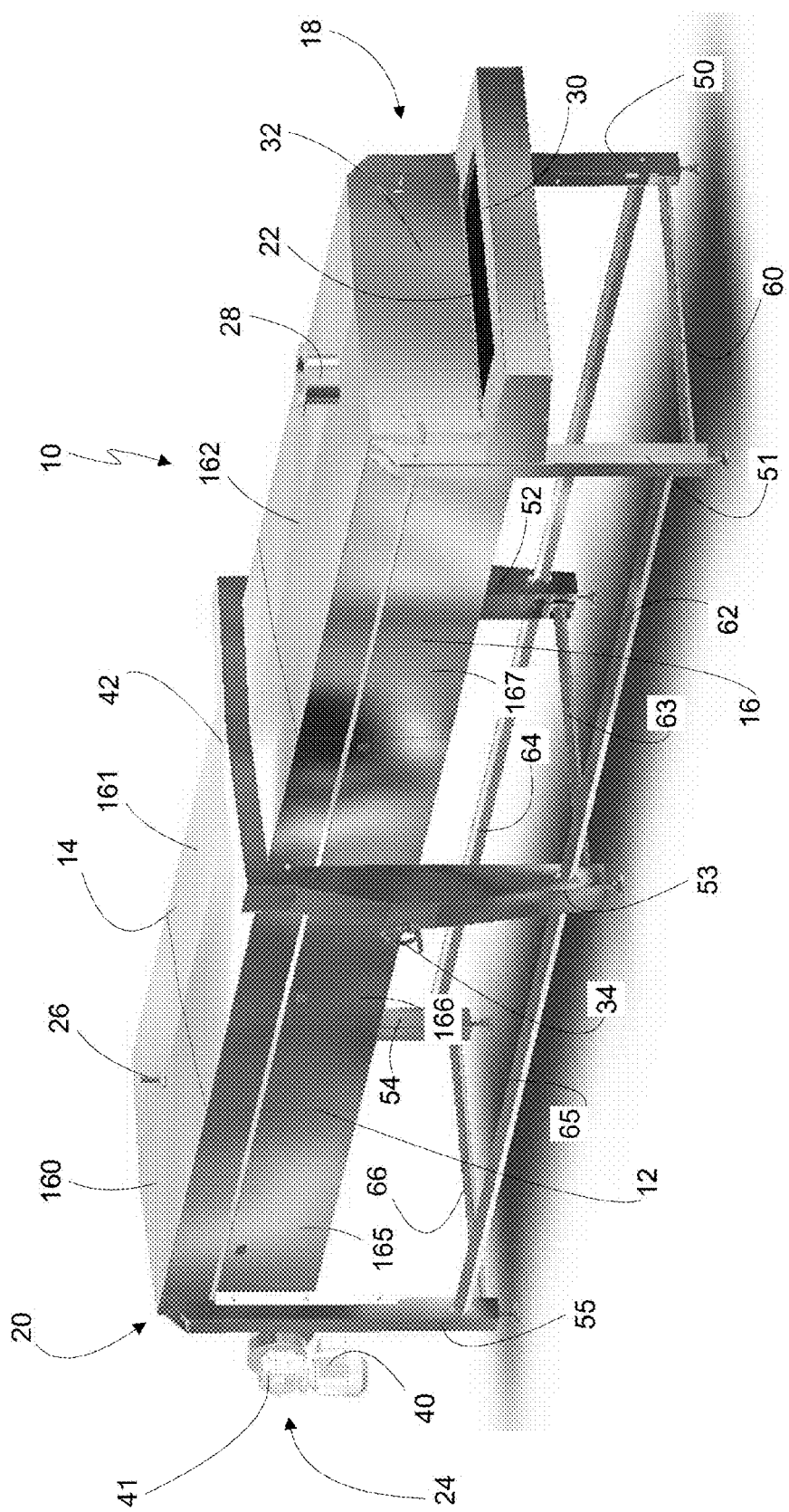
FIG. 1 is a front-left perspective view of one embodiment of the freezer of the present invention, the freezer being in a closed position.

In one respect, the invention comprises a freezer comprising: an upper section and a lower section, each comprising at least one insulated member, the lower section having a closed position in which the lower section is joined to the upper section, the upper and lower sections defining a tunnel having an entrance and an exit when the lower section is in the closed position, the lower section having an open position in which the lower section is separated from the upper section, the dimension from the entrance to the exit defining a length of the tunnel, a width of the tunnel being transverse to the length; a delivery system adapted to introduce a cryogenic fluid into the tunnel; a belt and a drive assembly, the belt having an upper run located in the tunnel when the lower section is in the closed position, the belt being pervious to liquid and vapor; and a lowering assembly adapted to lower and raise the lower section relative to the upper section.

In another respect, the invention comprises a freezer comprising: a housing comprising a plurality of insulated members that define a tunnel, the tunnel having a floor, opposing first and second sidewalls that extend upwardly from the floor, and a ceiling located opposite the floor, the housing having a first opening at a first end of the tunnel that defines an entrance and a second opening at an opposing second end of the tunnel that defines an exit, a length of the tunnel extending from the entrance to the exit; a delivery and exhaust system having at least one nozzle adapted to introduce a cryogenic fluid into the tunnel and having an exhaust port to allow the cryogenic fluid to exit the tunnel, the exhaust port being located in the ceiling and distal to the at least one nozzle; and a belt extending along the length of the tunnel, through the entrance and through the exit, the belt being continuous and having an upper run and a lower run that moves in a direction opposite to the upper run, and a drive assembly that is adapted to drive the belt; wherein any air-moving devices incorporated into the freezer are located external to the tunnel.

In yet another respect, the invention comprises a freezer comprising: a housing comprising a plurality of insulated members that define a tunnel, the tunnel having a floor, opposing first and second sidewalls that extend upwardly from the floor, and a ceiling located opposite the floor, the housing having a first opening at a first end of the tunnel that defines an entrance and a second opening at an opposing second end of the tunnel that defines an exit, a length of the tunnel extending from the entrance to the exit; a delivery system adapted to introduce a cryogenic fluid into the tunnel; a belt extending along the entire length of the tunnel, through the entrance and through the exit, the belt having an upper run and a lower run; and a drive assembly that is adapted to drive the belt, the drive assembly, the belt and the housing being configured so that the upper run lies atop the lower run when the belt is operated.

In yet another respect, the invention comprises a continuous belt having first and second side edges defining a width spanning from the first edge to the second edge, the belt comprising: a plurality of chains, each of the plurality of chains comprising a plurality of links, each of the plurality of links comprising a metal body having front and rear holes formed therein, a first chain of the plurality of chains located at the first side edge and a second chain of the plurality of chains located at the second side edge; at least one array of modules, each of the modules being made of a polymeric material and comprising a front row of axially-aligned tubes, a rear row of axially-aligned tubes and a plurality of arms connecting the front row of axially-aligned tubes to the rear row of axially-aligned tubes, each of the at least one array of modules positioned between two of the plurality of chains; and a plurality of metal rods, each of the plurality of metal rods extending across the width of the belt, each of the plurality of metal rods extending through the front row of axially-aligned tubes of one of the modules of each of the at least one array of modules, through the rear row of axially-aligned tubes of another one of the modules in each of the at least one array of modules, through the front or rear hole of one of the plurality of links in each of the plurality of chains, and through the front or rear hole of another one of the plurality of links in each of the plurality of chains.

DETAILED DESCRIPTION OF THE PREFERRED EMBODIMENT(S)

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It being understood that various changes may be made in the function and arrangement of elements without departing from the spirit and scope of the invention, as set forth in the appended claims. Reference numerals that are introduced in the specification in association with a drawing figure may be repeated in one or more subsequent figures without additional description in the specification in order to provide context for other features.

As used herein, the term "cryogenic fluid" is intended to mean a liquid, gas or mixed-phase fluid having a temperature less than −70 degrees C. Examples of cryogenic fluids include liquid nitrogen (LIN), liquid oxygen (LOX), and liquid argon (LAR), liquid carbon dioxide and pressurized, mixed phase cryogens (e.g., a mixture of LIN and gaseous nitrogen). Similarly, as used herein, the term "cryogenic temperature" is intended to mean temperatures at or below −70 degrees C.

Figure 2:
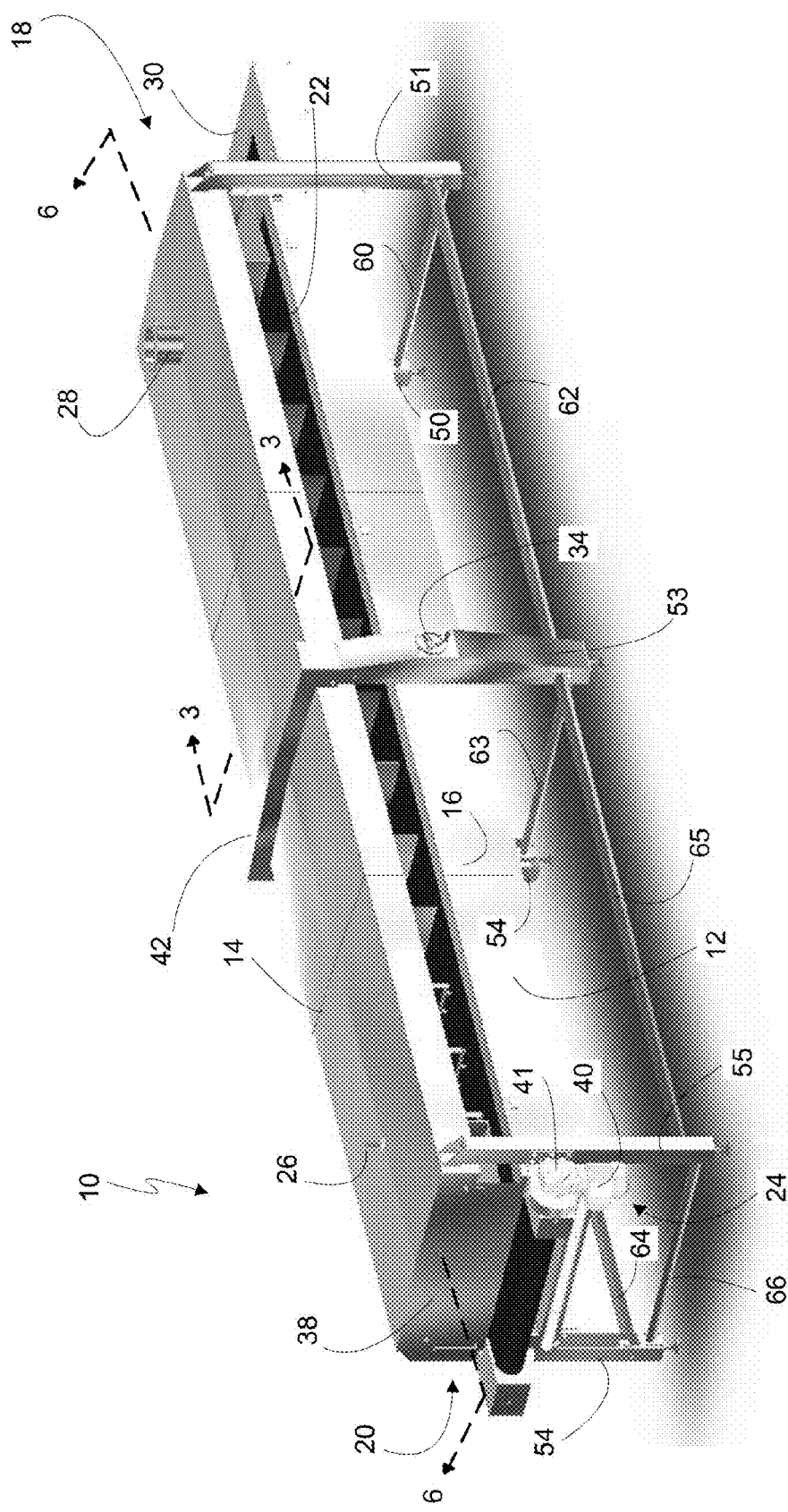
FIG. 2 is a left-rear perspective view of the freezer shown in FIG. 1, the freezer being in a partially open position.

Referring to FIGS. 1 and 2, reference numeral 10 refers generally to a freezer, which comprises one embodiment of the present invention. The freezer 10 includes a belt 22, which carries the product to be cooled or frozen (hereinafter "product") through a tunnel 12. As will be described in greater detail herein, the tunnel 12 is preferably chilled using a cryogen, such as liquid nitrogen (hereinafter "LIN"). The belt 22 is preferably pervious to liquid and vapor, so that the cryogen can pass through the belt 22.

Figure 3:
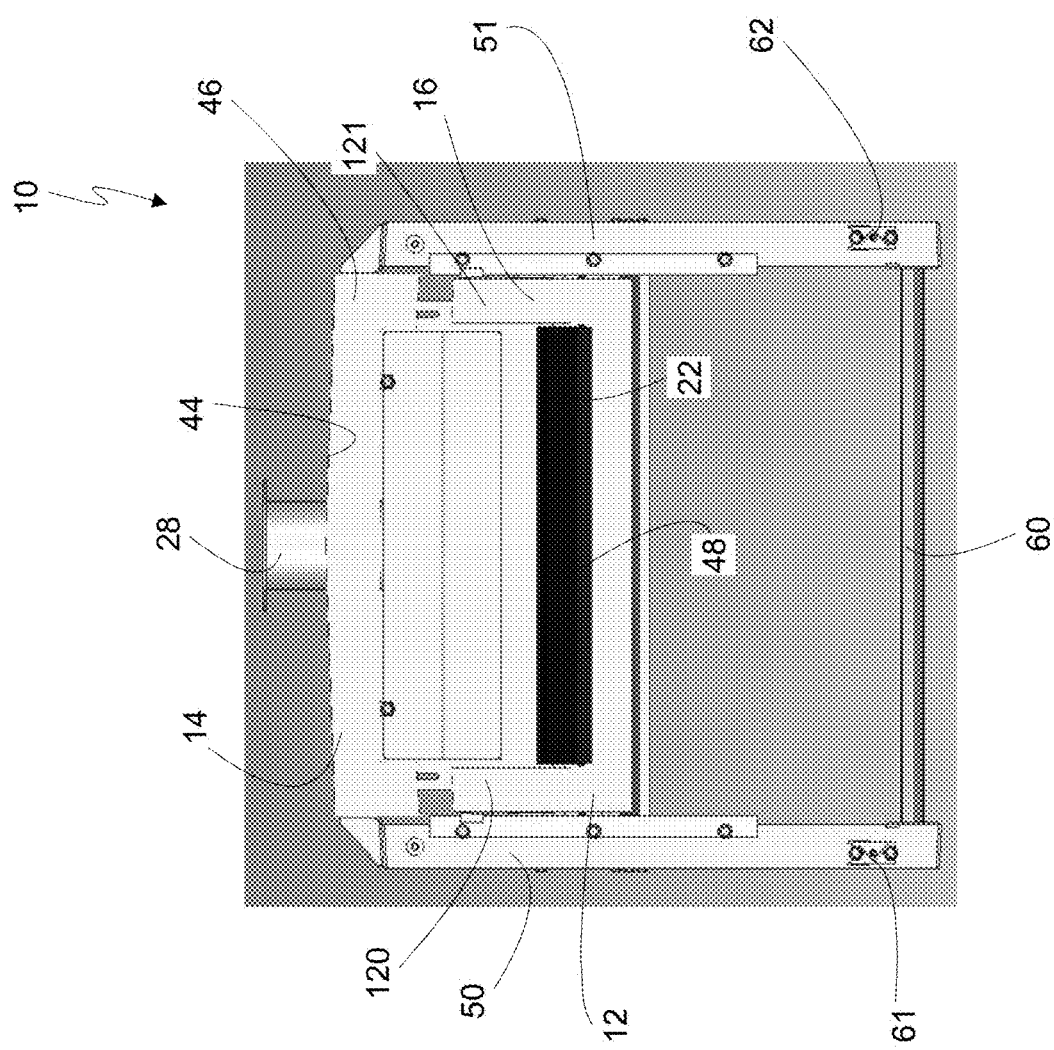
FIG. 3 is a sectional view taken along line 3-3 of FIG. 2.

The tunnel 12 comprises an upper section 14 and a lower section 16. In this embodiment, the upper section 14 is fixed and the lower section 16 can be lowered and raised, to move between a closed position (see FIG. 1) to an open position (see FIG. 5). Referring to FIG. 3, the upper and lower sections 14, 16 each form a U-shaped construction which, when in a closed position, are joined and define an interior volume having a generally rectangular cross-sectional shape.

In order for the freezer 10 to operate efficiently and to prevent escape of cryogenic fluid, it is important that the tunnel 12 be insulated and tightly sealed when closed. In this embodiment, the upper and lower sections 14, 16 comprise pre-fabricated panels having rigid insulation 46, such as polyurethane having a density of at least 30 kg/m³, for example, that is bonded to a shell 44. The shell 44 is preferably formed from a material that is strong, durable, can be sanitized, and can withstand cryogenic temperatures. In this embodiment, the shell 44 is formed from stainless steel, but could be formed of any suitable material. The use of pre-fabricated panels also provides the option to include a coating on the shell 44, such as a plastic coating suitable for food service. Use of such coatings is not practical using traditional, welded construction because the panel material and weld material will have different coefficients of thermal expansion, resulting in delamination of the coating.

Alternatively, the insulation 46 could be injected into the shell 44 or rigid insulation could be placed into the shell 44 after the shell 44 is fabricated. Although this construction method is more conventional in the freezer industry, it is more likely to result in gaps and/or voids in the insulation 46, which will reduce the insulating effectiveness of the tunnel 12.

Referring to FIG. 3, in order to facilitate shipping and assembly, the upper and lower sections 14, 16 each consist of two sidewalls 120, 121 that are spanned by a floor 48, which enables the upper and lower sections 14, 16 to be shipped flat. In this embodiment the sidewalls 120, 121 and floor 48 are welded together. Alternatively, each of the sidewalls 120, 121 could be bonded to the floor 48 using an adhesive that is airtight and will maintain bonding strength at cryogenic temperatures. As will be described in greater detail herein with reference to FIGS. 10-12, another alternative construction for the tunnel 12 is the use of insulated pre-fabricated panels that are joined by insulated end and corner sections.

The tunnel 12 is subject to a wide range of temperatures as it is cooled from ambient temperature (e.g., 10 to 30 degrees C.) to cryogenic operating temperatures (e.g., −70 to −196 degrees C.). In order to reduce the likelihood of buckling due to contraction and expansion of the upper and lower sections 14, 16, each preferably includes multiple segments that are joined together when the freezer 10 is assembled. Providing the upper and lower sections 14, 16 in multiple segments also simplifies assembly of the freezer 10, by reducing the weight and size of the individual parts.

Referring to FIG. 1, the upper and lower sections 14, 16 of this embodiment consist of three segments 160-162 and 165-167, respectively. Each segment is secured to adjacent segments using latches (not shown). In order to provide an airtight seal between the segments, gaskets (not shown) are preferably provided at the joints between each of the segments.

An alternative structure for the upper and lower sections is shown in FIGS. 7-8. In this embodiment, each of the upper and lower sections preferably comprise multiple interlocking pre-insulated panels that are bonded together only along the length of the sidewall or floor/ceiling. A sidewall 220 of the lower section 216 is illustrated and consists of four interlocking sections 225-228. Preferably, small gaps 222 are left between each of the sections 225-228 (the gaps 222 are exaggerated in FIG. 7), which are filled with an adhesive and/or suitable sealant that can withstand cryogenic temperatures. This construction allows the sidewall 220 to expand and contract under normal operating conditions without buckling.

A similar construction is also preferably used to join the sidewalls to the ceiling or floor in the upper and lower sections, respectively. Referring to FIG. 8, the sidewalls 220, 221 and floor 223 of the lower section 216 are joined using complimentarily-shaped stepped portions. Small gaps 230, which are filled with a bonding agent, are preferably left between the sidewalls 220, 221 and the floor 223 to allow for expansion and contraction.

Another alternative construction is shown in FIG. 9. Sidewalls 320, 321 and floor 323 of lower section 316 interlock in the same manner as the sections 225-228 shown in FIGS. 7-8. As in the embodiment shown in FIGS. 7-8, small gaps 330, which are filled with a bonding agent, are preferably left between the sidewalls 320, 321 and the floor 323 to allow for expansion and contraction. This light-weight, simple construction technique allows for reduced manufacturing cost and assembly time. Efficiency benefits can also be realized with regard to cool-down and warm-up times allowing product changes and intermittent production to have minimal effects on the overall freezing operational costs. A further benefit can be realized in the installation time required to install and start-up a new process, as the modular concept allows for quick on-location assembly and installation.

Referring again to FIGS. 1 and 2, the upper section 14 is supported by a plurality of legs 50-55, which are affixed to the upper section 14 with mounting brackets. Additional structural rigidity is provided by stabilizing members 56-66, which extend between each of the legs 50-55.

Figure 5:
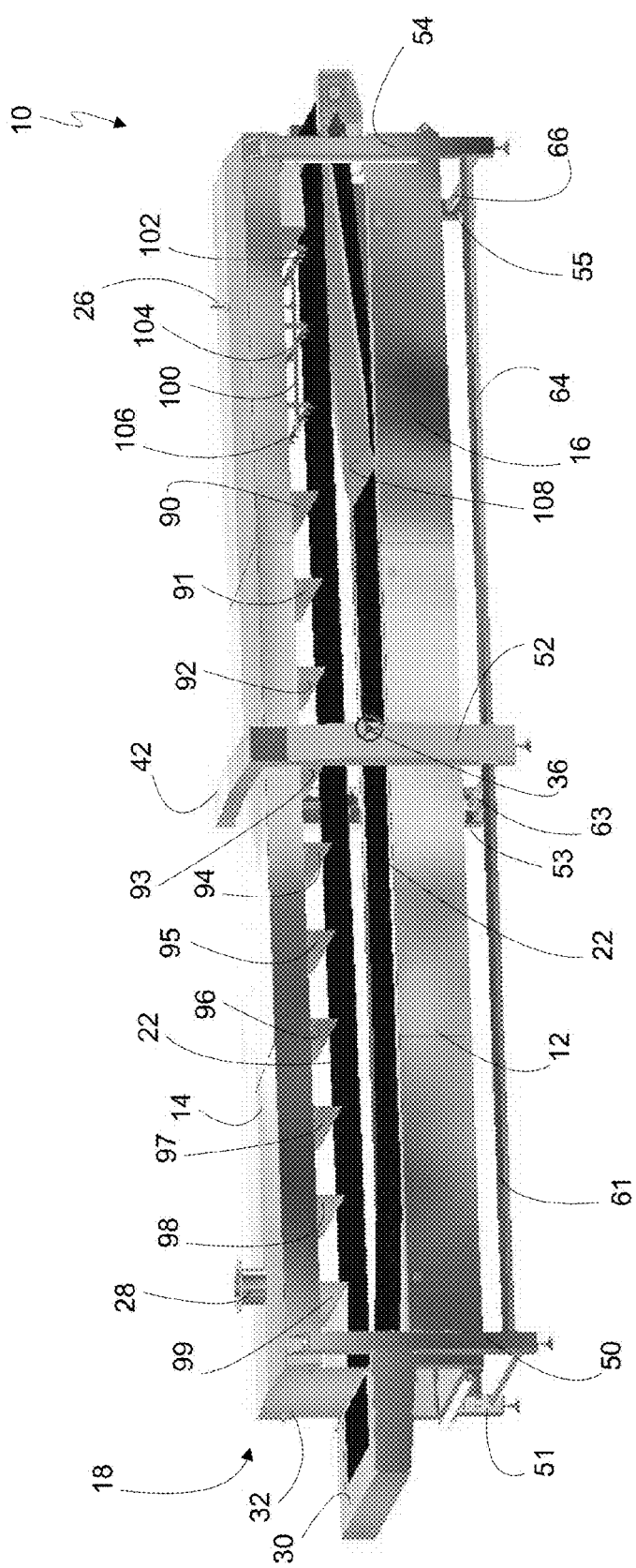
FIG. 5 is a right-rear perspective view of the freezer shown in FIG. 1, the freezer being in a nearly fully open (cleaning) position.

The lower section 16 is suspended by a lowering assembly comprising steel cables (not shown), which are routed through the legs 50-55 and are extended and retracted (thereby lowering and raising the lower section 16) by turning one of two hand cranks 34, 36 (see FIGS. 1 and 5). The hand cranks 34, 36 are preferably synchronized by a chain and axle assembly (not shown), which is contained within a cross bar 42 that extends across from leg 52 to leg 53, across the top of the upper section 14. The hand cranks 34, 36 each preferably include a self-locking gearbox (not shown), which reduce the force required to turn the hand cranks 34, 36 and prevent the lower section 16 from moving when an operator releases one of the hand cranks 34, 36. Other types of assemblies could be used to raise and lower the lower section 16, such as a screw drive driven by a drill or motor, for example.

Referring now to FIG. 4A, the belt 22 consists of six arrays 130-135 of plastic modules that provide the carrying surface for the product, a metal substructure consisting of end chains 140, 146 located at the left and right side edges of the belt 22, interior chains 141-145 located between each of the arrays 130-135, and rods 150-155 that extend from edge-to-edge through each array 130-135 of the plastic modules and each chain 140-146. In other embodiments, different numbers of arrays of plastic modules and interior chains could be provided. The metal chains and rods provide the tensile strength needed to support the belt 22 under the tension loads that are anticipated during operation of the freezer 10. The portion of the belt 22 shown in FIG. 4A repeats along the length of the belt 22, which forms a continuous loop. The plastic modules are used to reduce cost, weight and thermal absorption, and are designed for cryogenic service with adequate allowance included for contraction changes that occur when operating at reduced temperatures. The plastic modules can be made of any polymeric material suitable for cryogenic operating conditions. In this embodiment, the plastic modules are formed of high-density polyethylene (HDPE).

Each of the chains 140-146 consists of overlapping metal links. A link 68 is shown in FIG. 4B. The link 68 includes circular front and rear holes 69, 73 and an elongated middle hole 75. In this embodiment, each of the chains 140-146 consists of links that are identical to link 68. The front and rear holes 69, 73 and elongated middle hole 75 are labeled in FIG. 4C only with respect to link 68. It should be understood that the other links 70, 71 have the same orientation.

In order to aid in their description, links 68, 70 and 71, rods 150, 151, and 152, and plastic modules 76, 78 are numbered in FIG. 4C. The links 68, 70 are arranged so that the rear hole 73 of link 68 overlaps the front hole of link 70. Similarly, the front hole 69 of link 68 overlaps the rear hole of link 71. Rod 150 includes a hooked end 89, which extends through the middle hole of link 70 and the rear hole 73 of link 68.

Each plastic module consists of an alternating pattern of cylindrical tubes (through which a rod passes) arranged in front and rear rows (each consisting of axially-aligned tubes) and connecting arms which each connect a tube in the front row to an adjacent tube in the rear row. For example, plastic module 76 includes a tube 80 through which a portion of rod 151 passes. The tubes located in connecting arm 84 extends from an end of tube 80 to one end of tube 82, which is located on adjacent rod 150. A connecting arm 88 extends from the opposite end of tube 82 to one end of tube 86, which is located on rod 151. Adjacent connecting arms 84, 88 converge slightly (i.e., form a non-zero angle) as they extend from tubes 80, 86 to tube 82, which defines a V-shaped pattern and enables adjacent plastic modules 76, 78 to overlap. The angle formed by the connecting arms 84, 88 is about 40 degrees in this embodiment and is preferably between 30 and 60 degrees. This pattern is repeated along the width and length of the belt 22.

In this embodiment, the front and rear rows of tubes of each of the modules is aligned with the front and rear holes, respectively, of a link. For example, the front and rear rows of tubes 86, 82 of module 76 are aligned with the front and rear holes 69, 73, respectively, of link 68. In addition, the tubes in the front row of each module are offset from the tubes in the rear row of each module.

In this embodiment, each of the connecting arms (e.g., connecting arm 88) preferably includes a nib 57 extending laterally toward the right edge of the belt 22 and a second nib 59 extending laterally toward the left edge of the belt 22. The nibs 57, 59 are provided to prevent a person's finger from being inserted through the belt 22. Connecting arms located adjacent to the chains 140, 146 (e.g., connecting arm 33) include only one nib 35, which faces away from the respective chain 140, 146 in order to prevent binding.

When installed in the freezer 10, the belt 22 forms an endless loop consisting of an upper run 21 and a lower run 23 (see FIG. 6) that each move along linear paths in opposing directions. As is conventional, the ends of the belt 22 are retained by a belt drive assembly 24 (see FIG. 2) and a tensioning assembly 31 (see FIG. 6). The belt drive assembly consists of a motor 40 (see FIG. 1) which drives an axle 110 (see FIG. 6) through a gear reduction assembly 41 (see FIG. 1). Gears spaced along the axle 110 engage the belt 22. The tensioning assembly 31 also includes gears which are spaced along an axle 112 and engage the belt 22. Axle 112 of the tensioning assembly 31 is preferably movable along a horizontal axis that is perpendicular to the axle 112, which enables the amount of tension applied to belt 22 to be adjusted.

In this embodiment, the belt 22 is sufficiently long so as to allow for thermal contraction of the belt 22 over its entire length when the tunnel 12 is cooled from a temperature of at least 10 degrees C. (e.g., when non-operational or opened for cleaning) to a temperature of no greater than −70 degrees C., and preferably, no greater than −100 degrees C. (e.g., when the tunnel 12 is closed and operated), without reducing the distance between the axle 110 for the drive assembly 24 and the axle 112 for the tensioning assembly 31. Optionally, the belt 22 could be long enough to include a slack portion (not shown) that would hang downwardly from the axle 110 when the belt 22 is at ambient temperature (e.g., at least 10 degrees C.).

In this embodiment, the construction and assembly of belt 22 allows for thermal contraction of the belt 22 across its width when the tunnel 12 is cooled from ambient temperatures (e.g., at least 10 degrees C.) to operating temperatures (e.g., no greater than −70 degrees C. and, more preferably, no greater than −100 degrees C.). More specifically, the hooked ends of the rods (e.g., hooked end 89 of rod 150) are bent in a manner that provides a compressive force against the end chains 140, 146 which, in turn, compresses all of the elements across the width of the belt 22. Accordingly, when the tunnel 12 is cooled to operating temperatures and the elements of the belt 22 contract, the compressive force exerted by the hooked ends of the rods prevents gaps from forming between the modules and chains.

In this embodiment, other than the belt drive assembly 24 and a tensioning assembly 31, the belt 22 is not supported by any other belt guide structures. When the tunnel 12 is in a closed position and the belt 22 is operated, the lower run 23 of the belt runs atop the floor 48 of lower section 16 of the tunnel 12 and the upper run 21 runs atop of the lower run 23. In this embodiment, the upper run 21 moves in a direction of travel A (see FIG. 6) and the lower run 23 moves in the opposite direction. The absence of belt guide structures further reduces the cost and simplifies fabrication and assembly of the freezer 10, and reduces potential hygiene hazards. Due to this construction, belt 22 is also relatively light-weight, and therefore, can be removed and replaced relatively easily. In addition, the sandwiched operating configuration of the belt 22 (i.e., with the upper run 21 located directly atop the lower run 23 which, in turn, lays on the floor 48) alleviates a problem with conventional belt designs, in which there are gaps between the upper and lower runs and between the lower run and the floor. In such conventional designs, some LIN is sprayed through and flows beneath the upper run, which results in reduced heat transfer to the product being conveyed atop the upper run and results in a loss of refrigeration. Further losses can also be prevented with this configuration as the warming gas cannot easily pass through the upper run 21 and bypass the product to be frozen.

As is conventional, a loading table 30 is provided at the infeed end (entrance) 18 of the tunnel 12. The infeed end 18 and outfeed end (exit) 20 of the tunnel 12 each preferably include a height-adjustable exhaust hood 32, 38, respectively, which is designed to reduce cooling losses through the openings between the belt 22 and the hoods 32, 38. The distance from the infeed end 18 to the outfeed end 20 defines the length of the tunnel 12. The width of the tunnel 12 is transverse and co-planar to the width.

As noted above, the freezer 10 has a closed/operating position (see FIG. 1), in which the upper and lower sections 14, 16 are joined and sealed, as well as an open/cleaning position (see FIG. 6), in which the lower section 16 is separated from the upper section 14 by lowering the lower section 16. When the freezer 10 is in the open position, all of the components located inside the tunnel 12 are accessible for cleaning. The absence of belt guide structures along the length of the belt 22 (as mentioned above) enables clear visible access to the top and bottom sides of both the upper and lower runs 21, 23 of the belt 22 when the freezer 10 is in the open position, which simplifies cleaning/sanitizing of the freezer 10.

Figure 6:
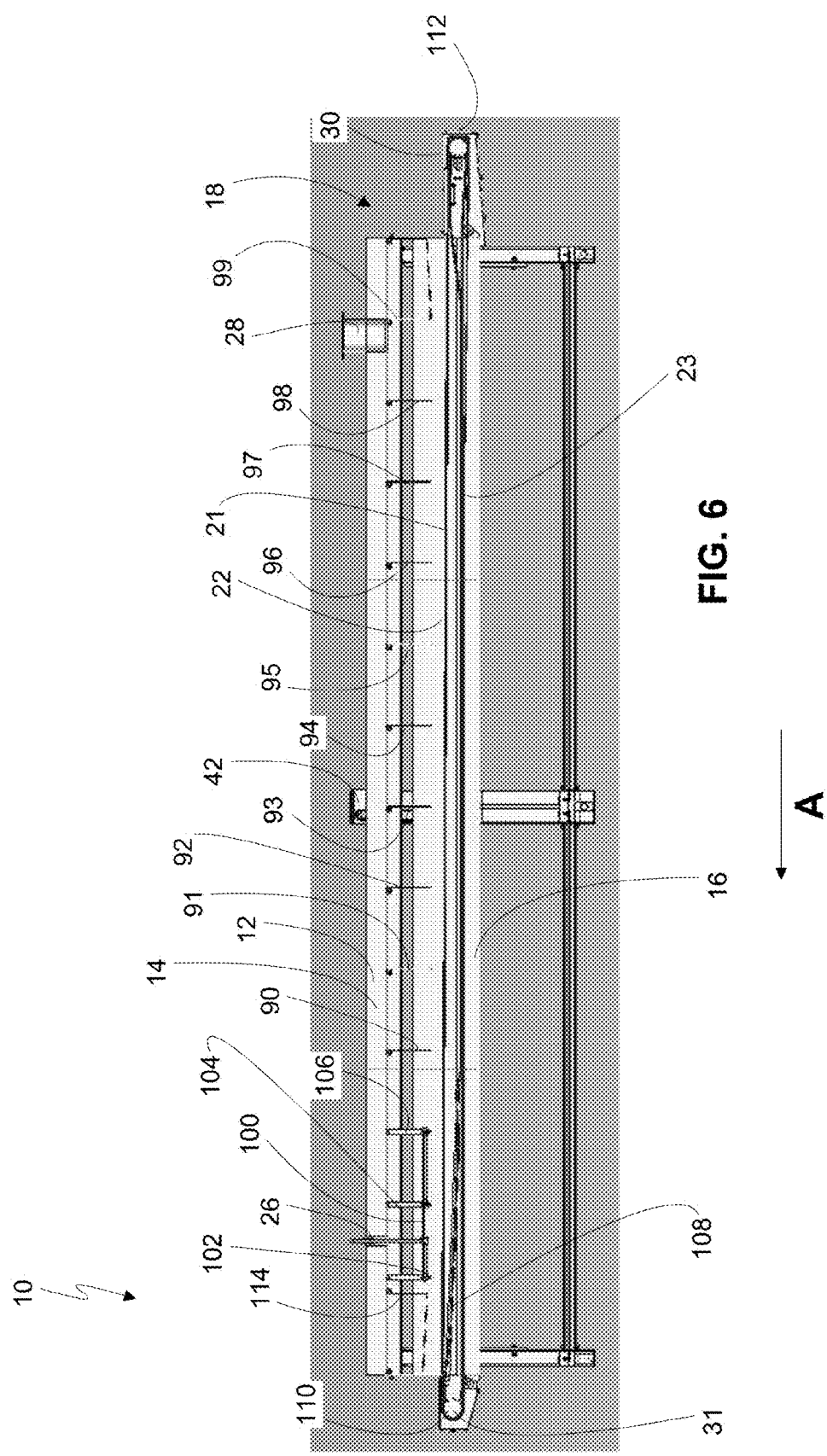
FIG. 6 is a sectional view taken along line 6-6 of FIG. 2.

Referring now to FIGS. 5 and 6, the cryogen, LIN in this embodiment, is supplied to the freezer 10 via a delivery system comprising an inlet 26, which is connected to three nozzle bars 102, 104, 106 via a manifold 100. The bars 102, 104, 106 are located near the outfeed end 20 of the tunnel 12. Each of the bars 102, 104, 106 includes a plurality of nozzles which spray the cryogen downwardly onto a tray 108, which is positioned between the upper and lower runs 21, 23 of the belt 22, is hinged at the outfeed end 20 of the tunnel 12, and preferably extends just beyond the nozzles. The purpose of tray 108 is to capture excess cryogen that is not completely vaporized and aid the under product heat transfer performance by cooling the belt 22. A greater or lesser number of bars 102, 104, 106 and/or a different number or configuration of nozzles could be provided, depending upon the application and the configuration of the tunnel 12.

In order to provide efficient thermal transfer from the cryogen to the product, it is desirable to create a counter-current flow for the cryogen in the tunnel 12 (i.e., in the opposite direction of travel A of the upper run 21). Accordingly, each of the nozzles is preferably oriented to direct its spray against the direction of travel A of the upper run 21. Nozzle angles in the range of zero degrees (vertical) to 90 degrees (horizontal) are possible and angles in the range of 5 degrees to 45 degrees are preferred. The modular design of the freezer 10 also allows for the tunnel 12 to be assembled for co-current flow by reversing segments 160 and 162 (see FIG. 1) of the upper section 14, which results in the reversal of the inlet 26, nozzle bars 102, 104, 106, manifold 100 and exhaust duct 28. In addition, a plurality of baffles 90-99 are spaced along the upper section 14 within the tunnel 12, the first baffle 90 being located in front of the last nozzle bar 106, extending to an exhaust duct 28 (which is located distal to the nozzles), and having the last baffle 99 located beyond the exhaust duct 28. In this embodiment, each of the baffles 90-99 is rectangular in shape, is vertically oriented (or could, alternatively, be angled in the direction of flow of the cryogenic fluid) and spans the width of the tunnel 12. As the cryogen exits the nozzles, it expands rapidly and moves toward the infeed end 18 of the tunnel 12. The baffles 91-98 increase the velocity of the cryogen by forcing it to pass through the smaller cross-sectional area between the lower end of each baffle and the belt 22. In addition, turbulence is created as the cryogen moves into the spaces between each baffle 91-98 and above the lower edges of the baffles 91-98. In this embodiment, in order to simplify assembly and allow for interchangeability of parts, all of the baffles 90-99 are identical. Alternatively, the baffles 91-98 could incrementally increase in height from the baffle 91 located closest to the nozzle bar 106 to the baffle 98 located closest to the exhaust duct 28, which would further increase the velocity of the cryogen as it moves from the nozzles to the exhaust duct 28. Optionally, the baffles 90-99 could be removably attached, which would enable the baffles 90-99 to be replaced with baffles having different geometry. Baffles 90 and 99 reduce refrigeration losses through the infeed end 18 and outfeed end 20 of the tunnel 12.

Rapid warming and expansion of the cryogen, as well as the exhaust hood 32 and an end baffle 99, help direct the cryogen up the exhaust duct 28. In order to enhance countercurrent flow, an exhaust fan (not shown) is preferably provided at the top end of an exhaust stack (not shown), which is connected to the upper end of the exhaust duct 28.

The above-described configuration of the tunnel 12 provides adequate thermal transfer from the cryogen to the product in a wide range of common applications without the need for turbulence fans located within the tunnel 12. Turbulence fans and other air-moving devices are included in prior art freezer designs to direct the flow of the cryogen through the tunnel 12 and are typically driven by electrical power, which introduces heat inefficiencies into the freezer 10. The absence of such fans, or any other type of air-moving device, within the tunnel 12 means that the freezer 10 of the present invention is able to be operated with lower heat loss than a conventional freezer of similar capacity. The construction can also be dramatically simplified to reduce costs and to allow simple fabrication techniques to be applied. Examples of "air-moving devices" include fans, blowers, ventilators, pneumatic air-movers and the like. As used herein, the term "air-moving device" is not intended to include nozzles, other delivery devices that introduce the cryogenic fluid into the tunnel 12, the belt 22, or any stationary elements in the tunnel 12, such as baffles 90-99.

Appropriate nozzle configuration (including number of nozzles, angle of the nozzles, nozzle type) is within the skill of one of ordinary skill in the art. It should be noted, however, that the absence of air-moving devices within the tunnel 12 increases the importance of proper nozzle configuration because the "momentum" provided by the cryogenic fluid exiting the nozzles is of greater importance to the refrigeration performance of the tunnel 12 than in embodiments in which turbulence fans and/or other in-tunnel air-moving devices are used. Of course, the precise "momentum" provided by the Nozzle type selection is made in order to select a nozzle that will allow momentum and directional spray to aid the direction and heat transfer performance.

Figure 10:
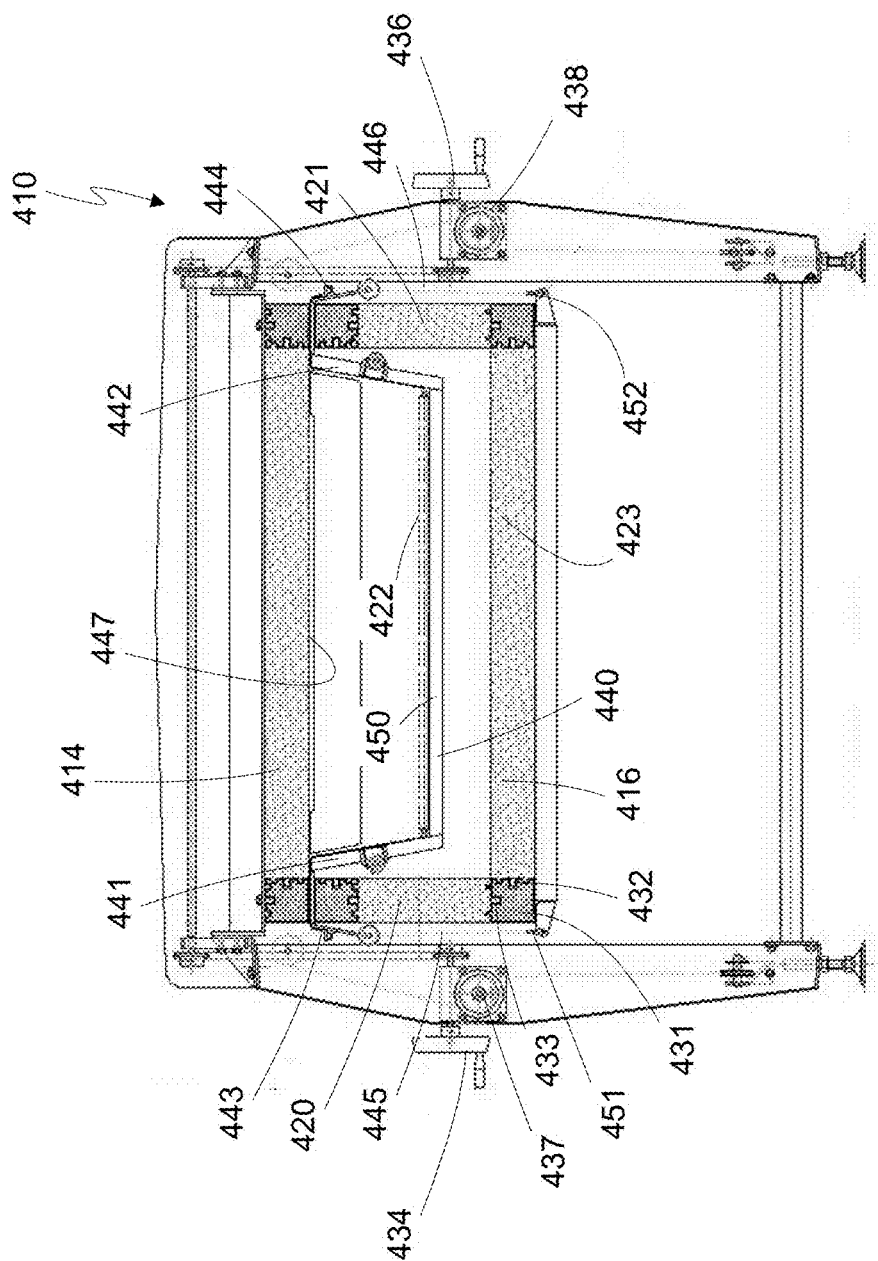
FIG. 10 is a sectional view taken along line 3-3 of FIG. 2, showing another embodiment of the freezer with the lower section in a closed position.

Another embodiment of a freezer 410 is shown in FIGS. 10-12. The overall structure of the freezer 410 is substantially similar to the freezer 10 shown in FIGS. 1-6. In this embodiment, the upper and lower sections 414, 416 are assembled by joining the insulated members using insulated polymeric corner elements. The insulated members are joined to the corner elements by engaging slots located in the corner elements with cams located in the insulated members. The cams can be engaged and disengaged from the slots by turning an engagement socket using an Allen wrench. The insulated members and corner elements preferably have compressible seals along the surfaces in which they are joined to provide an airtight seal. For example, the floor 423 of the lower section 416 is joined to the side wall 420 by corner element 431. The corner element 431 has a slot 432 which engages a cam (not shown) located in the floor 423 and a slot 433 which engages a cam (not shown) located in the side wall 420. Should it be desirable to disassemble the lower section 416, this can be accomplished by disengaging the cams.

The embodiment of the freezer 410 also includes a liner 440 that is located between the upper and lower sections 414, 416 and extends the length of the tunnel. The liner 440 includes a floor 450 that is parallel to the ceiling 447 of the upper section 414 (which opposes the floor 423) and the floor 423 of the lower section 416. The liner 440 also includes sidewalls 441, 442 that extend upwardly from the floor 450 and over the upper edges of the side walls 420, 421 of the lower section 416 and attachment posts 443, 444, which enable the liner 440 to be attached to the cables 445, 446 used to raise and lower the lower section 416. The belt 422 (which is identical to belt 22) has a lower run that lies atop the floor 450 when the lower section 416 is in a closed position (see FIG. 10).

In order to facilitate cleaning & sanitizing, the liner 440 preferably comprises a single sheet of metal that spans the lower section 416, but may be assembled from multiple segments along its length (like the upper and lower sections). If multiple segments are provided, they are preferably separable for cleaning and sanitation purposes.

In addition, the liner 440 is preferably capable of being raised and lowered independently of the lower section 416, to facilitate cleaning of the lower section 416. In this embodiment, the lower section 416 and the liner 440 are moved from a closed position (FIG. 10) to an open position (FIG. 11) by turning one of the hand cranks 434, 436, which lengthens the cables 445, 446 via a gearbox 437, 438. Referring to FIG. 12, the liner 440 can be raised without raising the lower section 416 by removing the cables 445, 446 from attachment posts 451, 452 located on the lower section 416, then turning one of the hand cranks 434, 436 in the opposite direction used to lower the liner 440 and lower section 416.

Use of the liner 440 enables the use of insulated members and insulated corner elements in standard commercially available sizes, while maintaining a preferred tunnel 12 profile and location of belt 422.

While the principles of the invention have been described above in connection with preferred embodiments, it is to be clearly understood that this description is made only by way of example and not as a limitation of the scope of the invention.

What is claimed is:

1. A freezer comprising:
a housing including a plurality of insulated members that define a tunnel, the tunnel having a floor, opposing first and second sidewalls that extend upwardly from the floor, and a ceiling located opposite the floor, the housing having a first opening at a first end of the tunnel that defines an entrance and a second opening at an opposing second end of the tunnel that defines an exit, a length of the tunnel extending from the entrance to the exit;
a delivery and exhaust system having at least one nozzle adapted to introduce a cryogenic fluid into the tunnel, the delivery and exhaust system also having an exhaust port to allow the cryogenic fluid to exit the tunnel, the exhaust port being located in the ceiling and distal to the at least one nozzle;
a drive assembly that is adapted to drive a belt, the drive assembly being located outside of the tunnel, the belt extending along the length of the tunnel and being continuous, the belt having an upper run that extends through the tunnel and a lower run that extends through the tunnel, at least a portion of the upper run lying atop and in contact with at least a portion of the lower run when the belt is operated, wherein the at least a portion of the upper run moves in a direction opposite to the at least a portion of the lower run, wherein the at least a portion of the upper run and the at least a portion of the lower run are located within the tunnel; and
a tensioning assembly located outside of the tunnel.

2. The freezer of claim 1, wherein the lower run lies atop and is in contact with the floor when the belt is operated.

3. The freezer of claim 1, wherein the lower run lies atop and is in contact with a liner when the belt is operated, the liner being parallel with the floor and positioned between the floor and ceiling.

4. The freezer of claim 1, further comprising a tray located between a portion of the upper run and a portion of the lower run, wherein the drive assembly, the tensioning assembly, and the tray are the only structures separating the upper run and the lower run.

5. The freezer of claim 1, wherein the drive assembly further comprises a first gear located at the first end of the tunnel and a second gear located at the second end of the tunnel, the first gear rotatable about a first axle, the second gear rotatable about a second axle, the belt including a slack portion that hangs downwardly from the first or second gear when the tunnel is at a temperature of at least 10 degrees C.

6. The freezer of claim 1, further comprising a plurality of baffles extending downwardly from the ceiling toward the belt, at least some of the plurality of baffles being located between the at least one nozzle and the exhaust port.

7. The freezer of claim 1, wherein each of the at least one nozzle is oriented to direct the cryogenic fluid against a direction of travel of the upper run.

8. The freezer of claim 7, wherein each of the at least one nozzle being directed at an angle of between 5 and 45 degrees from vertical.

9. The freezer of claim 1, wherein the belt further comprises first and second side edges defining a width spanning from the first edge to the second edge, a metal substructure comprising a plurality of chains and a plurality of rods, a first chain of the plurality of chains located at the first side edge and a second chain of the plurality of chains located at the second side edge, at least one array of modules, each of the modules being made of a polymeric material and positioned between two of the plurality of chains, each of the plurality of metal rods extending across the width of the belt and through one of the at least one array of modules, each of the at least one arrays of modules having allowance for contraction sufficient to enable the belt to be operated at cryogenic temperatures.

10. The freezer of claim 9, wherein each of the plurality of chains comprises a plurality of links, each of the plurality of links comprising a metal body having front and rear holes formed therein, each of the modules comprising a front row of axially-aligned tubes, a rear row of axially-aligned tubes, and a plurality of arms connecting the front row of axially-aligned tubes to the rear row of axially-aligned tubes, each of the plurality of metal rods extending through the front row of axially-aligned tubes of one of the modules of each of the at least one array of modules, through the rear row of axially-aligned tubes of another one of the modules in each of the at least one array of modules, through the front or rear hole of one of the plurality of links in each of the plurality of chains, and through the front or rear hole of another one of the plurality of links in each of the plurality of chains.

11. A freezer comprising:
a housing including a plurality of insulated members that define a tunnel, the tunnel having a floor, opposing first and second sidewalls that extend upwardly from the floor, and a ceiling located opposite the floor, the housing having a first opening at a first end of the tunnel that defines an entrance and a second opening at an opposing second end of the tunnel that defines an exit, a length of the tunnel extending from the entrance to the exit;
a delivery and exhaust system having at least one nozzle adapted to introduce a cryogenic fluid into the tunnel, the delivery and exhaust system also having an exhaust port to allow the cryogenic fluid to exit the tunnel, the exhaust port being located in the ceiling and distal to the at least one nozzle; and
a drive assembly that is adapted to drive a belt, the belt extending along the length of the tunnel and being continuous, the belt having an upper run that extends through the tunnel and a lower run that extends through the tunnel, at least a portion of the upper run lying atop and in contact with at least a portion of the lower run when the belt is operated, wherein the at least a portion of the upper run moves in a direction opposite to the at least a portion of the lower run, wherein the at least a portion of the upper run and the at least a portion of the lower run are located within the tunnel, the belt further comprising first and second side edges defining a width spanning from the first edge to the second edge, a metal substructure comprising a plurality of chains and a plurality of rods, a first chain of the plurality of chains located at the first side edge and a second chain of the plurality of chains located at the second side edge, a third chain of the plurality of chains located between the first side edge and the second side edge, at least one array of modules, each of the modules being made of a polymeric material and positioned between the first and second chains of the plurality of chains, each of the plurality of metal rods extending across the width of the belt and through one of the at least one array of modules, each of the at least one arrays of modules having allowance for contraction sufficient to enable the belt to be operated at cryogenic temperatures.

12. The freezer of claim 11, wherein each of the plurality of chains comprises a plurality of links, each of the plurality of links comprising a metal body having front and rear holes formed therein, each of the modules comprising a front row of axially-aligned tubes, a rear row of axially-aligned tubes, and a plurality of arms connecting the front row of axially-aligned tubes to the rear row of axially-aligned tubes, each of the plurality of metal rods extending through the front row of axially-aligned tubes of one of the modules of each of the at least one array of modules, through the rear row of axially-aligned tubes of another one of the modules in each of the at least one array of modules, through the front or rear hole of one of the plurality of links in each of the plurality of chains, and through the front or rear hole of another one of the plurality of links in each of the plurality of chains.

13. The freezer of claim 12, wherein the axially-aligned tubes of the front and rear rows of axially-aligned tubes are cylindrical tubes.

14. The freezer of claim 11, wherein adjacent connecting arms of the plurality of arms connecting the front row of axially-aligned tubes to the rear row of axially-aligned tubes converge to form a non-zero angle as they extend from the rear row of axially-aligned tubes to the front row of axially-aligned tubes.

15. The freezer of claim 14, wherein the non-zero angle is between 30 and 60 degrees.

16. A freezer comprising:
a housing including a plurality of insulated members that define a tunnel, the tunnel having a floor, opposing first and second sidewalls that extend upwardly from the floor, and a ceiling located opposite the floor, the housing having a first opening at a first end of the tunnel that defines an entrance and a second opening at an opposing second end of the tunnel that defines an exit, a length of the tunnel extending from the entrance to the exit;
a delivery and exhaust system having at least one nozzle adapted to introduce a cryogenic fluid into the tunnel, the delivery and exhaust system also having an exhaust port to allow the cryogenic fluid to exit the tunnel, the exhaust port being located in the ceiling and distal to the at least one nozzle; and
a drive assembly that is adapted to drive a belt, the belt extending along the length of the tunnel and being continuous, the belt having an upper run that extends through the tunnel and a lower run that extends through the tunnel, at least a portion of the upper run lying atop and in contact with at least a portion of the lower run when the belt is operated, wherein the at least a portion of the upper run moves in a direction opposite to the at least a portion of the lower run, wherein the at least a portion of the upper run and the at least a portion of the lower run are located within the tunnel, the belt further comprising first and second side edges defining a width spanning from the first edge to the second edge, a metal substructure comprising a plurality of chains and a plurality of rods, a first chain of the plurality of chains located at the first side edge and a second chain of the plurality of chains located at the second side edge, each chain of the plurality of chains comprising a plurality of links having a metal body having a first hole and a second hole formed therein, at least one array of modules, each of the modules being made of a polymeric material and positioned between the first and second chains of the plurality of chains, each of the modules comprising a front row of axially-aligned tubes, a rear row of axially-aligned tubes, and a plurality of arms connecting each tube of the front row of axially-aligned tubes to the rear row of axially-aligned tubes, each of the plurality of metal rods extending across the width of the belt and through the front row of axially-aligned tubes of one of the modules of each of the at least one array of modules, through the rear row of axially-aligned tubes of another one of the modules in each of the at least one array of modules, through the first hole of one link of the plurality of links in the first chain, through the second hole of one link of the plurality of links in the first chain, through the first hole of one link of the plurality of links in the second chain, and through the second hole of one link of the plurality of links in the second chain.

17. The freezer of claim 16, wherein the second hole of each link in the plurality of links of the first and second chains is an elongated hole.

18. The freezer of claim 16, wherein the axially-aligned tubes of the front and rear rows of axially-aligned tubes are cylindrical tubes.

19. The freezer of claim 16, wherein the arms connecting each tube of the front row of axially-aligned tubes to the rear row of axially-aligned tubes diverge to form a non-zero angle as they extend from the front row of axially-aligned tubes to the rear row of axially-aligned tubes.

20. The freezer of claim 19, wherein the non-zero angle is between 30 and 60 degrees.

* * * * *